(12) United States Patent
Sturm

(10) Patent No.: US 6,238,316 B1
(45) Date of Patent: May 29, 2001

(54) DIFFERENTIAL AXLE SPEED SENSING MECHANISM

(76) Inventor: Gary Lee Sturm, 7629 Westford Ct., Fort Wayne, IN (US) 46835

( * ) Notice: Subject to any disclaimer, the term of this patent is extended or adjusted under 35 U.S.C. 154(b) by 0 days.

(21) Appl. No.: 09/296,399

(22) Filed: Apr. 23, 1999

(51) Int. Cl.$^7$ ............................................. F16H 48/30
(52) U.S. Cl. ............................................. 475/150
(58) Field of Search .................... 475/150, 351; 74/438, 446, 447, 449, 10.3; 72/176, 182

(56) References Cited

U.S. PATENT DOCUMENTS

| | | | |
|---|---|---|---|
| 1,662,557 | * | 3/1928 | Zubaty .................................... 74/449 |
| 2,923,166 | * | 2/1960 | Brindley et al. ....................... 74/447 |
| 3,732,752 | * | 5/1973 | Louckes et al. ..................... 475/150 |
| 3,769,533 | * | 10/1973 | Pauwels ........................... 475/150 X |
| 3,845,671 | | 11/1974 | Sharp et al. . |
| 3,949,841 | | 4/1976 | Jovick et al. . |
| 4,263,824 | * | 4/1981 | Mueller .................................. 475/86 |
| 4,683,775 | * | 8/1987 | Hilker et al. .......................... 475/150 |
| 4,724,935 | * | 2/1988 | Roper et al. ..................... 475/150 X |
| 4,796,345 | * | 1/1989 | Krapfenbauer ..................... 74/438 X |
| 4,862,025 | * | 8/1989 | Dierker, Jr. et al. ............. 475/150 X |
| 4,945,783 | | 8/1990 | Grob . |
| 4,953,670 | * | 9/1990 | Chemelewski ................... 475/150 X |
| 4,953,760 | | 9/1990 | Chemelewski . |
| 5,482,132 | | 1/1996 | Birshing . |
| 5,486,757 | * | 1/1996 | Easley ............................... 472/150 X |
| 5,515,708 | | 5/1996 | D'Agostino . |
| 5,655,987 | * | 8/1997 | Bowerman et al. ............... 74/462 X |
| 5,855,133 | * | 1/1999 | Hayes ..................................... 72/176 |
| 5,896,776 | * | 4/1999 | Handa et al. .......................... 74/424 |

FOREIGN PATENT DOCUMENTS

320346 * 6/1931 (GB) ..................................... 74/447

* cited by examiner

Primary Examiner—Sherry Estremsky
Assistant Examiner—Roger Pang
(74) Attorney, Agent, or Firm—Liniak, Berenato, Longacre & White

(57) ABSTRACT

A roll-formed tone wheel is provided in a speed sensing differential axle mechanism. The tone wheel is formed by passing an elongated strip of material through a roll-forming die. The elongated strip is cut into lengths, then these lengths are formed into individual rings forming the tone wheel. The tone wheel is provided on one of a ring gear flange or a axle assembly and the tone wheel teeth are disposed for relative rotation with respect to a stationary electronic pickup element secured rigidly in spaced relation with respect to the tone wheel teeth. In a preferred embodiment, the tone wheel is provided with locking tabs to secure the tone wheel with respect to the differential case.

9 Claims, 6 Drawing Sheets

DIFFERENTIAL AXLE SPEED SENSING MECHANISM

BACKGROUND OF THE INVENTION a) Field of the Invention

This invention relates to an automotive speed sensing system used in such devices as speedometers, anti-locking brakes and traction control systems. More particularly, the invention relates to the use of a roll-formed tone wheel and sensing device within an axle system, particularly with respect to sensing the speed of a differential assembly.

b) Description of Related Art

There are numerous prior art axle assemblies that provide speed sensing mechanisms for a differential axle housing or axle. Typically, a toothed tone wheel is disposed on the rotating member and a magnetic sensor senses the rotational speed of the tone wheel teeth. Most sensing systems within a differential axle housing involve the placement of a stamped tone wheel at the ring gear flange of the differential assembly, or at a trunnion extending from and typically integral with the ring gear flange. Sensing systems attached to an axle shaft typically involve a powdered metal, or forged, tone wheel disposed on that shaft. Other tone wheel systems use sensing teeth that are integrally formed as part of the differential case during the casting process.

The manufacturing process associated with conventional stamped tone wheel systems results in substantial material waste, as will be appreciated by those skilled in the art.

Additional drawbacks related to the use of pressed rings containing teeth for registration with the pickup or sensing element, include the requirement of additional parts, extra tooling and machining, potential seating problems for the extra parts, and increased runout which causes transducer sensing problems.

The need therefore exists for a speed sensing system that reduces the substantial material waste associated with convention tone wheel systems, while maintaining the sensitivity and reliability of the system.

SUMMARY OF THE INVENTION

The invention presented and disclosed herewith provides a system wherein all of the aforenoted disadvantages of the prior art are either minimized or entirely eliminated. Significantly, the speed sensing differential mechanism of this invention is not subjected to the material waste associated with the stamped metal tone wheel.

In a preferred form, the speed sensing differential axle mechanism of the present invention provides a roll-formed tone wheel lightly pressed onto the differential case or axle, thereby providing an adequate run-out specification for the electrical gap between the sensor and the tone wheel teeth.

The tone wheel itself is roll-formed from a long steel sheet that is continuously passed through a suitable roll-forming die. Once the teeth are properly formed into the steel sheet, the sheet is cut to a proper length determined by the differential and axle specifications. The ends of the cut sheet having roll-formed teeth are then spot welded to form a toothed ring properly sized for placement on the differential case or axle assembly. In the preferred design, tabs formed on the inner side of the roll-formed tone wheel lock onto a turned diameter of the differential case and the wheel is held in place by the attachment of the ring gear.

A stationary electronic pickup element extends toward the teeth and is spaced therefrom by a gap of conventional dimensions. The pickup element extends from, and is secured in, a cover plate on the axle housing for ease of access and convenience.

DETAILED DESCRIPTION OF A PREFERRED EMBODIMENT

Figure 1:
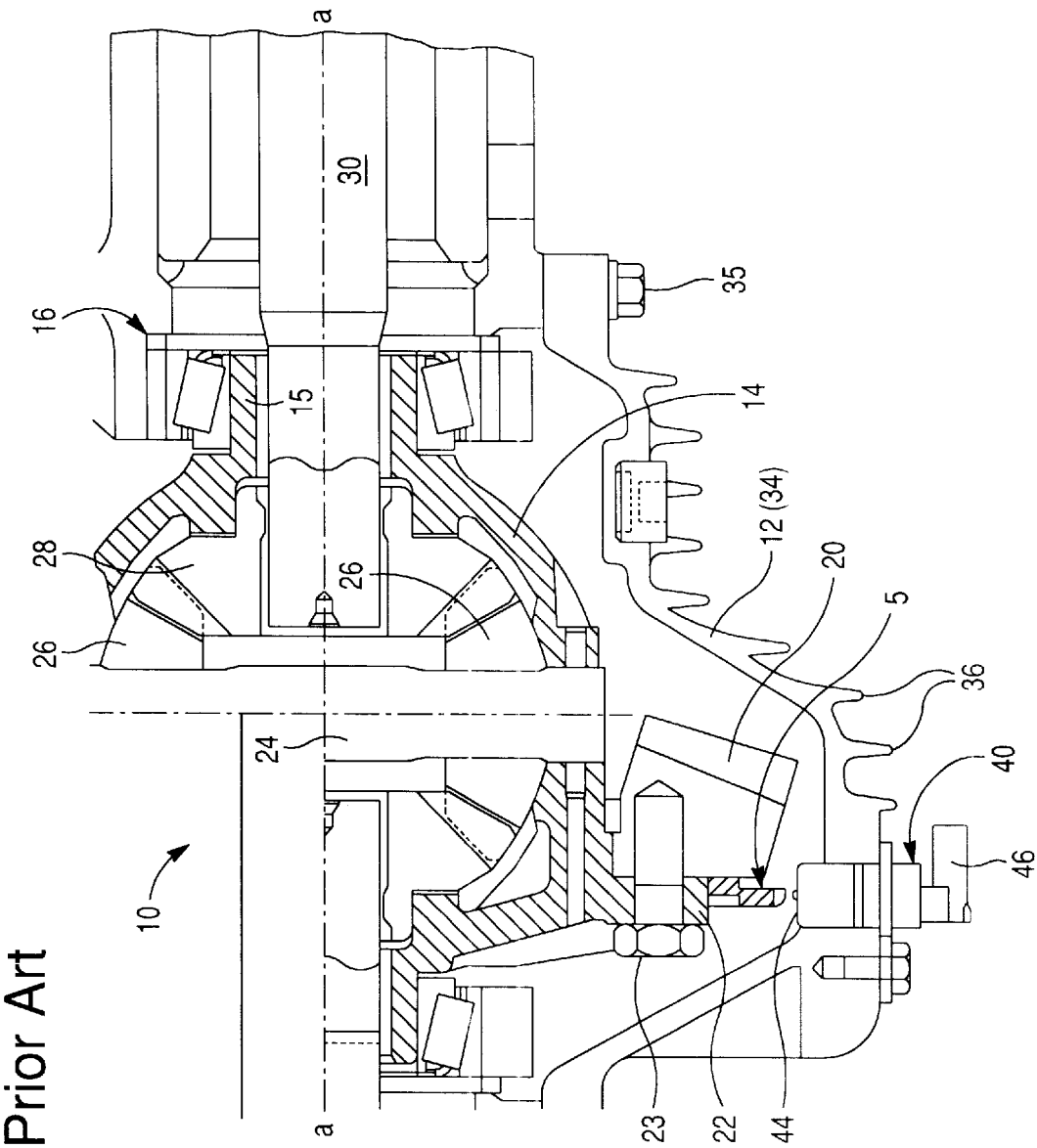
FIG. 1 is a fragmentary cross sectional view of a conventional differential axle assembly which incorporates a conventional stamped tone wheel and speed sensor.

Referring initially to FIG. 1, a differential axle assembly 10 includes an external housing or gear carrier 12 having heat radiating fins 36. The gear carrier rotatably supports a differential case 14 by a pair of axially extending bearing support trunnions 15 which are integral to the differential case and housed within a pair of annular trunnion bearings 16.

A drive pinion (not shown) is in constant mesh with a ring gear 20 bolted to a ring gear flange 22. The differential case ring gear flange 22 contains bolt apertures to receive the bolt 23 securing the ring gear 20 to the differential case 14. Rotation of the drive pinion via a prime mover (not shown) causes the differential case 14 to rotate by means of the ring gear flange 22, which is also an integral part of the differential case 14.

The case 14 houses a differential gear set including a cross shaft 24 which supports a pair of rotatable differential pinions 26 for engagement with a pair of side or differential gears 28. The differential gears 28 are in turn splined to left and right half shafts 30 (only the right one of which is shown), and differential action is effected through conventional means. An optional clutch pack may be utilized for effecting limited slip performance of the differential, as will be appreciated by those skilled in the present art.

An access cover plate 34 is provided on the external carrier 12, and is secured thereto by a plurality of threaded cover screws 35, only one of which is shown. In the presently preferred embodiment, it will be noted that the axle shafts 30 are rotatably supported within the external carrier 12 by respective axle bearings disposed on opposite sides of the housing 12. The case 14 is disposed for symmetrical rotation about axis "a—a", which is coincident with the axes of rotation of the axle shafts.

The transducer 40 includes a sensor body from which extends a transducer pickup 44. The pickup element is rigidly held in position adjacent the rotatable differential case 14 and tone wheel 5.

The teeth of the tone wheel 5 provide a conventional media for electronic pickup and sensing of angular rotational speeds of shafts, gears, and the like, as will be appreciated by those skilled in the art. In the presently preferred embodiment, the pickup 44 registers with the rotating teeth, radially spaced by a predetermined gap from each tooth at the instant of registration. A transmitter cable 46 (FIG. 1) is coupled to the speed sensing transducer 40 to convey the electronic information monitored thereby to an appropriate readout mechanism (not shown).

Figure 2:
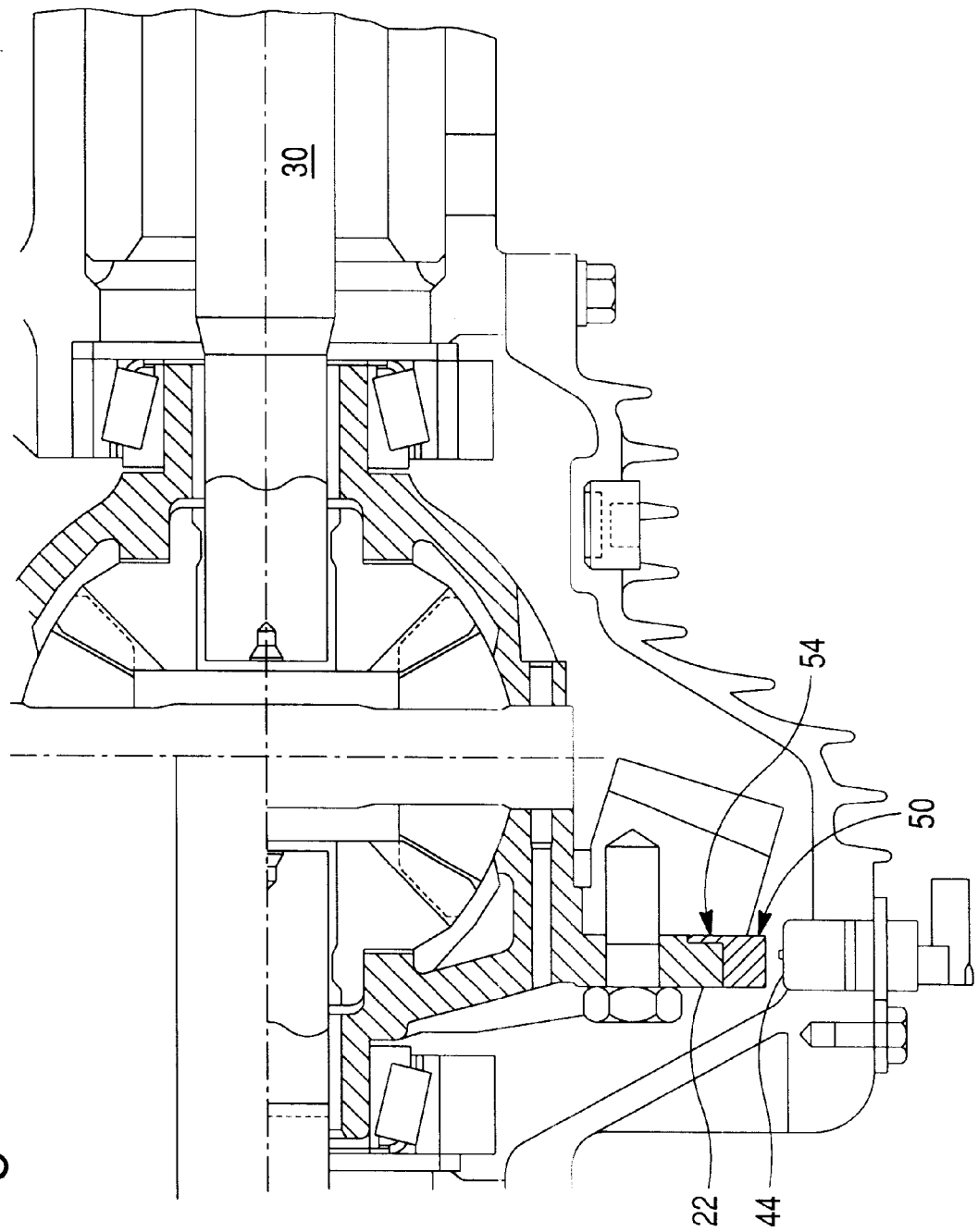
FIG. 2 is a fragmentary cross sectional view of a differential axle assembly which incorporates the roll-formed tone wheel constructed in accordance with the present invention.
Figure 3:
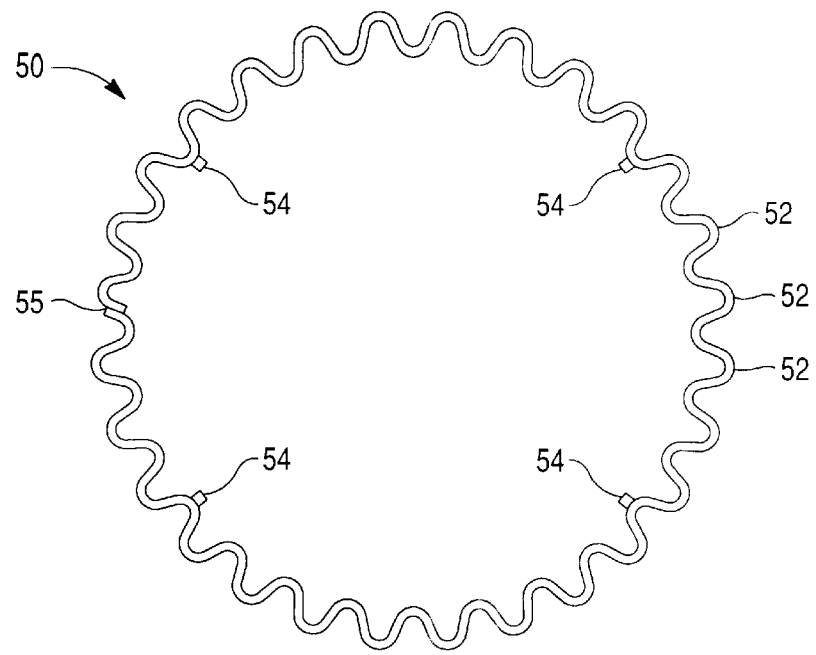
FIG. 3 is a side view of the roll formed tone wheel formed in accordance with this invention.
Figure 5:
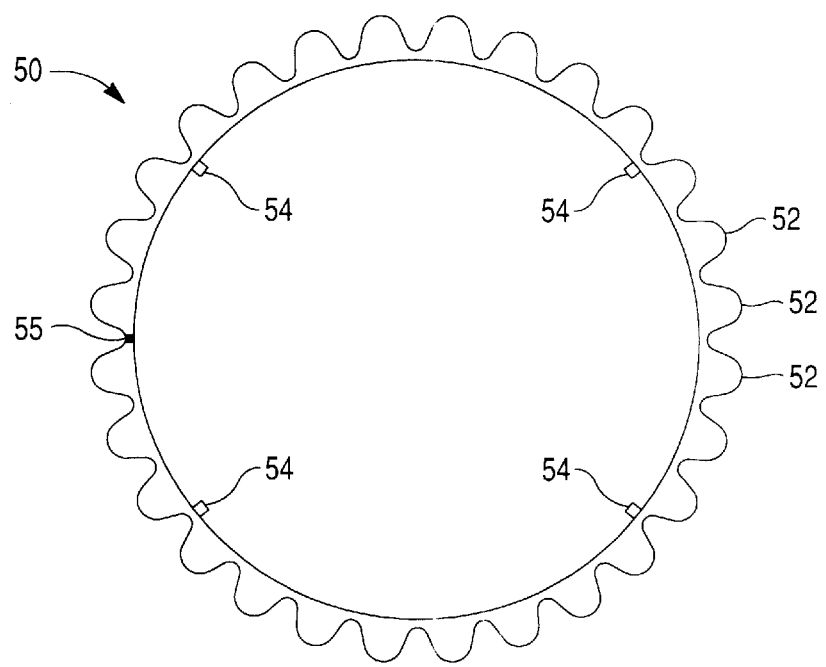
FIG. 5 is a side view of a roll formed tone wheel formed in accordance with this invention.

The present invention involves the formation and mounting of a roll-formed tone wheel 50 that replaces the conventional stamped tone wheel 5 shown in FIG. 1. With reference to FIG. 2, the roll-formed tone wheel 50 is shown mounted to the external differential case flange 22 in spaced relation with respect to the pickup/sensor 44. The roll-formed tone wheel comprises a series of teeth 52 disposed on the outer peripheral surface of the wheel 50. Locking tabs 54 are preferably formed on the tone wheel 50 in order to effectively secure the tone wheel onto the flange diameter 22 (see FIGS. 3 and 5). As shown in FIG. 2, the locking tabs 54 are held in place in a recess in the differential case by the attachment of the ring gear 20 to secure the tone wheel 50 in fixed relation with respect to the differential case and sensor 44.

Figure 4:
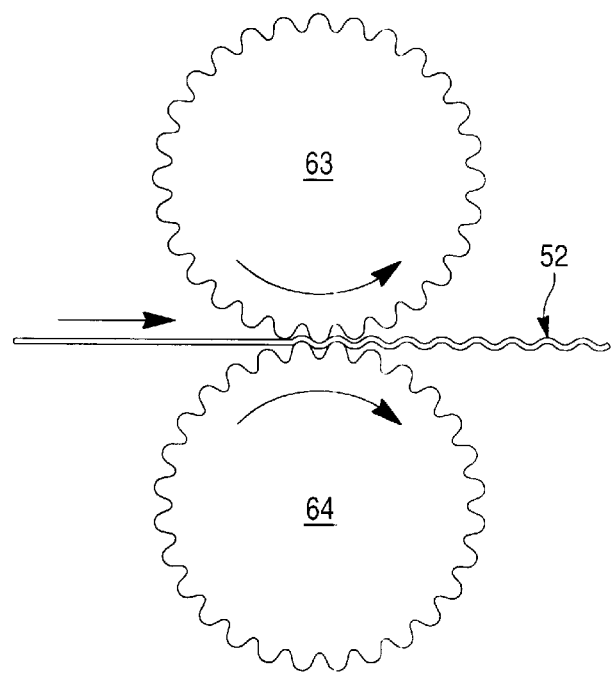
FIG. 4 is schematic view of the roll-forming die mechanism used to form the teeth in the tone wheel of this invention.
Figure 6:
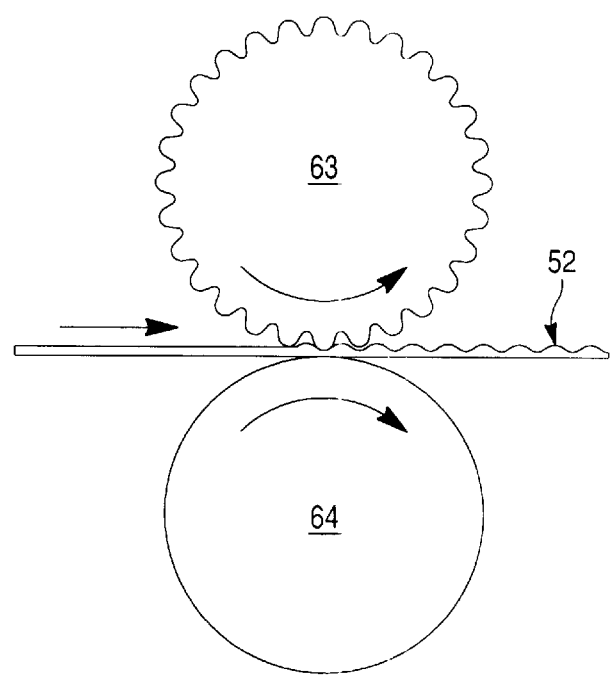
FIG. 6 is a schematic of a roll forming die mechanism used to form the teeth in the tone wheel of this invention.
Figure 7:
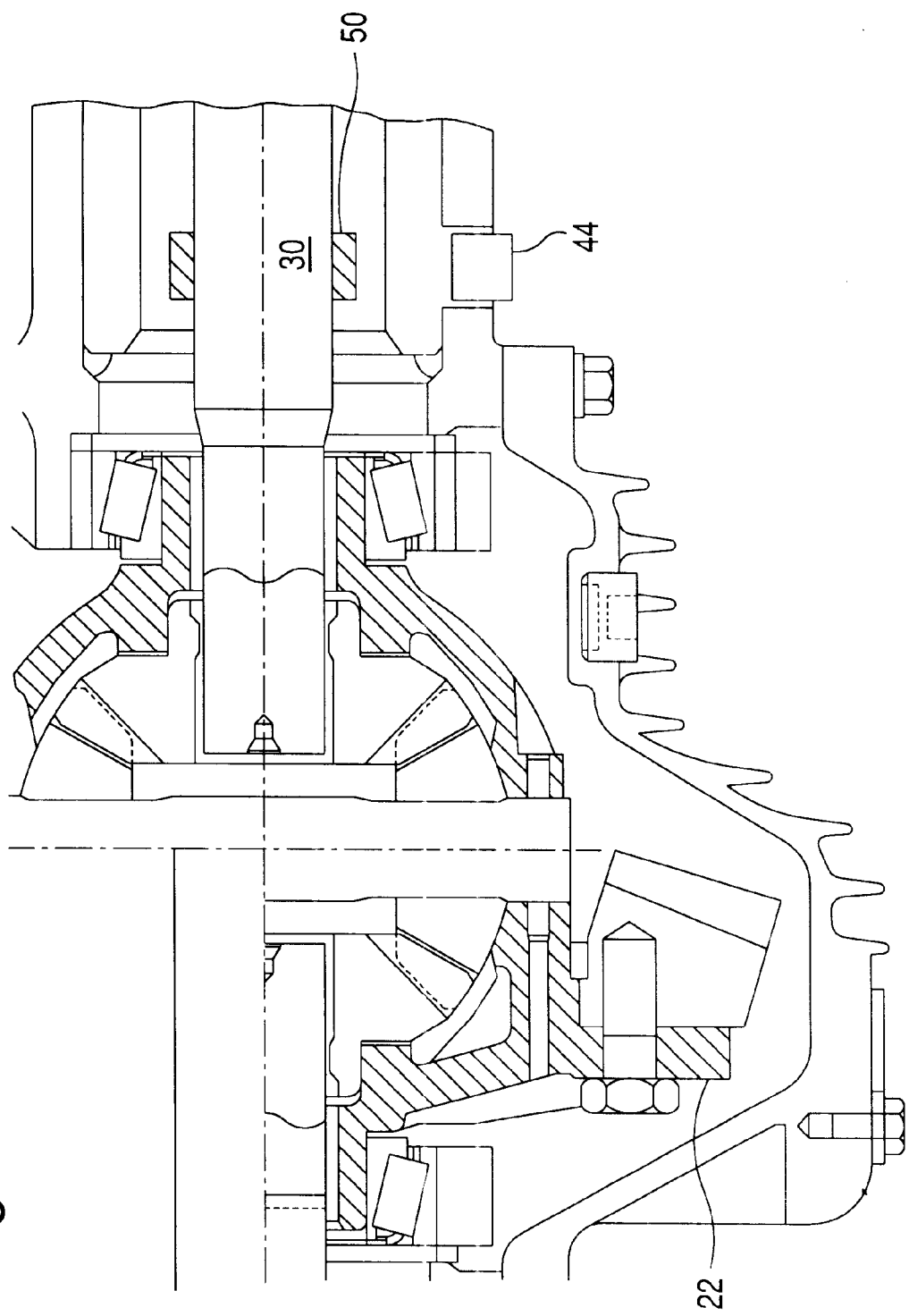
FIG. 7 is a cross sectional view of a differential axle assembly with a tone wheel secured to an axle driven by the differential assembly.
Figure 8:
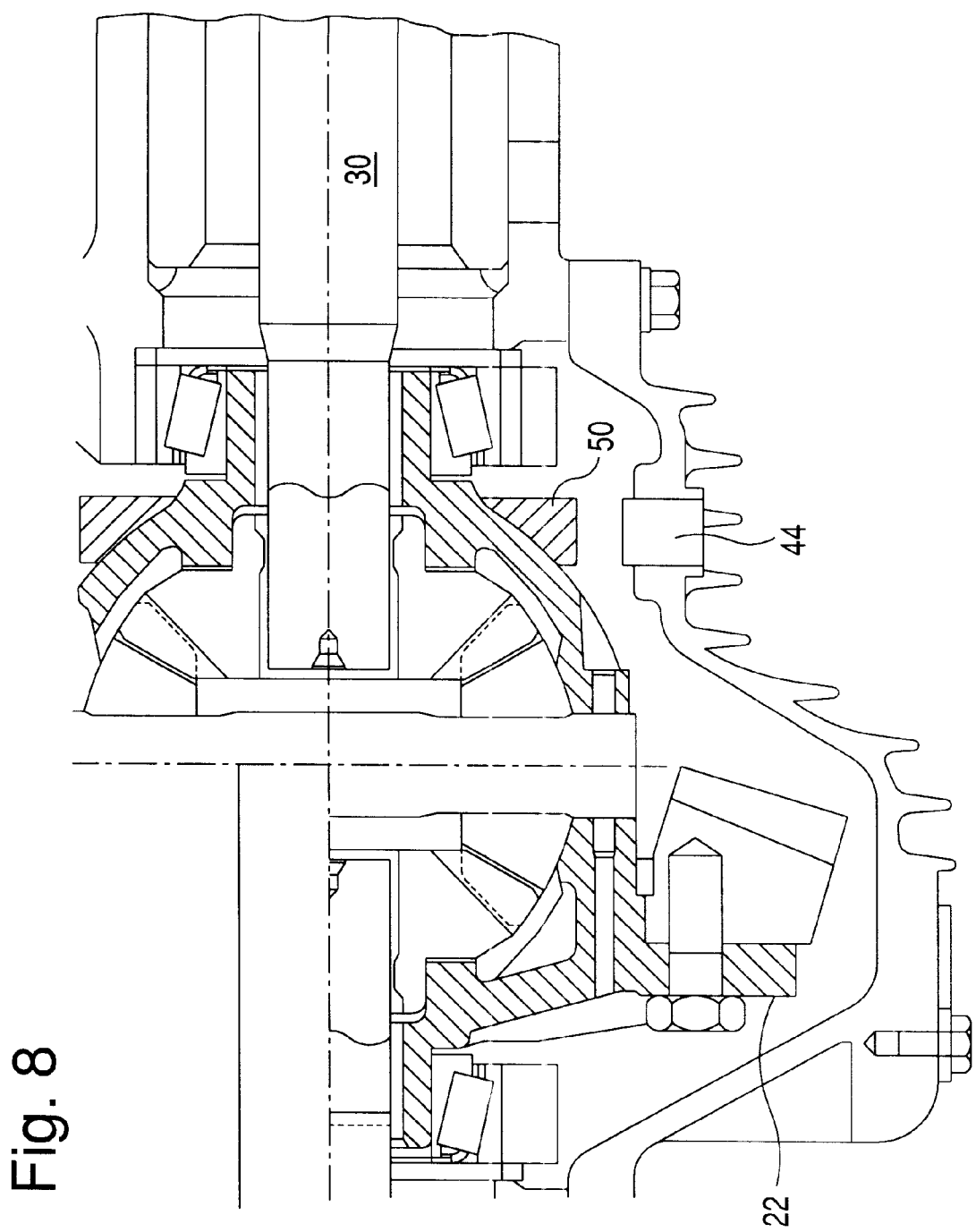
FIG. 8 is a cross sectional view of a differential axle assembly with a tone wheel secured on an external diameter of the differential case offset from the ring gear flange.

FIGS. 4 and 6 provide a schematic representation of the roll-forming die arrangement employed to form a roll-formed tone wheel 50 in accordance with this invention. As with conventional roll-forming techniques, the present invention provides a set of cylindrical dies that roll in the same direction, squeezing the workpiece or steel sheet between them to form teeth on the surface of the workpiece. In accordance with the preferred embodiment of this invention, a workpiece in the form of an elongated steel is continuously passed through the cylindrical dies 63, 64, whereby the sheet is processed to form the tone wheel teeth 52 having a predetermined tooth profile. The sheet may also be processed in a similar manner to form the locking tabs 54 at predetermined positions and having a predetermined configuration determined by the specifications of the differential.

After the roll-forming process, the elongated sheet is cut at predetermined lengths corresponding to the circumference of the differential case flange 22 to form a number of processed strips. After being cut, the ends of these processed strips are overlapped and spot welded together to form a ring defining the tone wheel 50 (see spot weld 55). Of course, the forgoing steps are presented by way of example and are not intended to limit the scope of this invention. For example, the present invention should not be limited to spot welding and should not be limited to the specific die arrangement described above and illustrated in the accompanying drawings. The primary purpose of this invention is to provide a roll-formed tone wheel for use in an automotive speed sensing system, and the preferred embodiments are only examples that achieve a roll-formed tone wheel.

The benefits of the described presently preferred embodiment of the speed sensing differential assembly 10 are numerous. First and foremost, the roll-formed tone wheel is cost advantageous. A conventional tone wheel stamping is is blanked from a rectangular sheet of steel approximately the size of the differential outer flange diameter. The inner portion of the tone ring and also the outer portion outside the diameter are excluded as waste. Thus, the stamped material cost includes much material with non-productive use that is expelled as scrap material. The roll-formed tone wheel will have little waste as the base steel material will be produced in a width wide enough to produce the base tone wheel plus locking tabs with no material waste. The roll-formed tone wheel will also be lighter in weight due to less material involved in the design. Moreover, the assembly process of this invention maintains the tolerances and reliability of necessary to accurately sense the speed of the rotating body.

Although only one presently preferred embodiment has been shown and described herein, the following claims are envisioned to cover numerous alternative embodiments which will fall into the spirit and scope thereof. For example, the roll-formed tone wheel has been shown and described with respect to a differential case assembly; however, the roll-formed tone wheel will provide the same benefits to speed sensing systems disposed on a rotating axle. Likewise, the roll-formed tone wheel may be located on the ring gear itself, on a different area of the differential case, or one another rotating body unrelated to a differential assembly.

What is claimed is:

1. A speed sensing differential axle mechanism for sensing a rotational speed of at least one component, said mechanism comprising:

a differential assembly including a gear carrier, a differential case including a pair of opposed support trunnions, said case rotatably supported in said gear carrier by said pair of opposed trunnions, said differential case further including a body portion positioned intermediately of said trunnions, said body portion disposed for containing a differential gear set including a cross shaft supporting a pair of differential pinions, and a pair of side gears in mesh with said pinions, said body portion including a ring gear flange adapted to be mounted to a ring gear, a roll-formed tone wheel comprising a plurality of spaced teeth formed by at least one roll-forming die and a pair of opposing edges running along a length on opposite sides of said roll-formed tone wheel wherein said opposite edges are exposed to an open environment adjacent said roll-formed tone wheel;

an electronic pickup element disposed in spaced relation with respect to said teeth of said roll-formed tone wheel.

2. The speed sensing differential axle mechanism of claim 1, wherein said roll-formed tone wheel is secured to said differential assembly.

3. The speed sensing differential axle mechanism of claim 1, wherein said roll-formed tone wheel is secured to an axle driven by said differential assembly.

4. The speed sensing differential axle mechanism of claim 1, wherein said roll-formed tone wheel comprises an elongated strip formed with said teeth, said elongated strip being secured end-to-end to form a ring.

5. The speed sensing differential axle mechanism of claim 1, wherein said roll-formed tone wheel is disposed on said ring gear flange of said differential case.

6. The speed sensing differential axle mechanism of claim 5, wherein said roll-formed tone wheel further comprises at least one internal tab for locking said tone wheel to said ring gear flange.

7. The speed sensing differential axle mechanism of claim 6, wherein said at least one internal tab is secured between said ring gear flange and a ring gear fastened to said ring gear flange.

8. The speed sensing differential axle mechanism of claim 1, wherein said roll-formed tone wheel is disposed on an external diameter of said differential case offset from said ring gear flange.

9. The speed sensing differential axle mechanism of claim 1, wherein said electronic pickup element is secured rigidly to said gear carrier.

\* \* \* \* \*